April 17, 1934.  C. J. ULRICH  1,955,615

INDICATING CIRCUIT CONTROLLER

Filed July 28, 1932   2 Sheets-Sheet 1

Inventor
Carl J. Ulrich
By his Attorneys
Merchant & Wigore

April 17, 1934.  C. J. ULRICH  1,955,615
INDICATING CIRCUIT CONTROLLER
Filed July 28, 1932    2 Sheets-Sheet 2
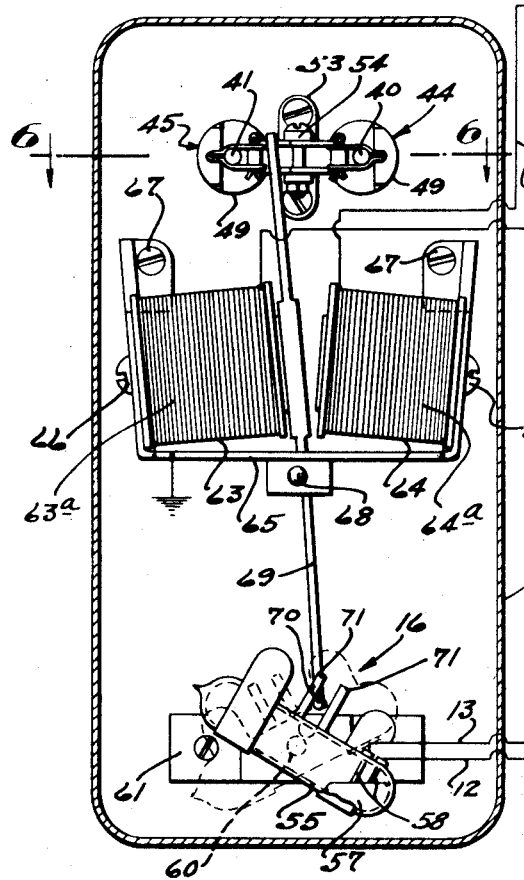
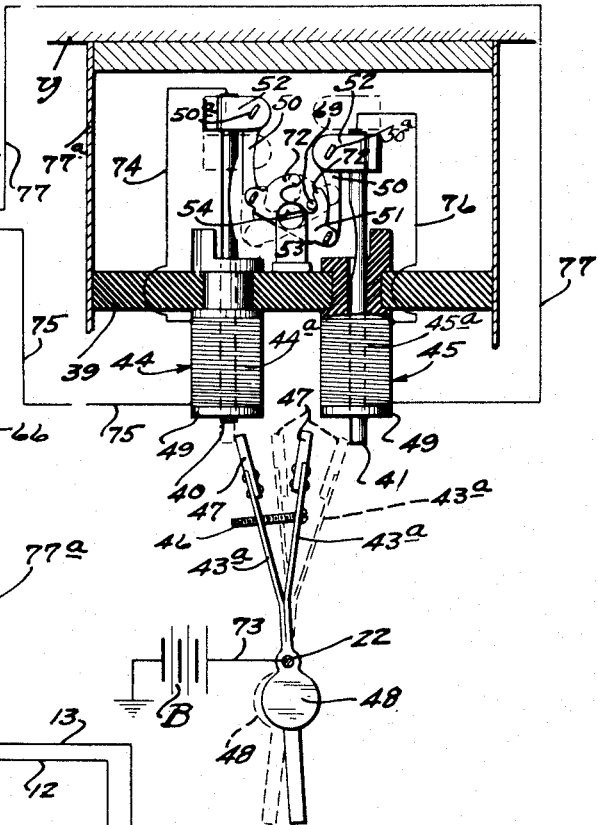
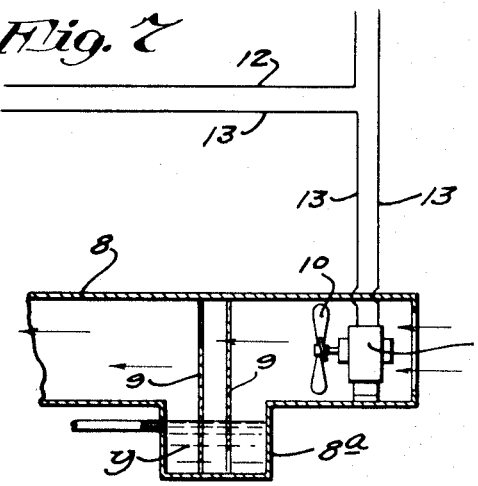
Inventor
Carl J. Ulrich
By his Attorneys
Merchant & Kilgore Patented Apr. 17, 1934

1,955,615

UNITED STATES PATENT OFFICE 1,955,615

INDICATING CIRCUIT CONTROLLER

Carl J. Ulrich, Minneapolis, Minn.

Application July 28, 1932, Serial No. 625,311

9 Claims. (Cl. 200—52)

My present invention relates to indicating circuit controllers and is in the nature of a continuation in part of my co-pending application for Letters Patent in the United States, Serial Number 460,917, filed of date July 13, 1930, and entitled "Moisture responsive circuit controller."

More specifically the invention relates to devices of the class described which, when used in connection with apparatus effecting changes in the surrounding air or other medium, will indicate the condition of the surrounding air or other medium and also control the action of the cooperating apparatus for effecting changes in the air or other medium surrounding the indicating and control device and cause the same to maintain the said medium in a substantially predetermined desired condition.

An important object of the present invention is the provision in an indicating and controlling device of the class described, of means variably adjusting the action of the device to control the action of a cooperating apparatus for effecting changes in the condition of the air or other medium surrounding the indicating and control device in such a manner that it will maintain the surrounding air or other medium in predetermined but changeable condition.

The form of the invention here illustrated, like that illustrated in my above identified co-pending application, incorporates a moisture sensitive element and is adapted for use in connection with humidifiers and when so used will control the action of the humidifier so as to maintain a desired predetermined amount of moisture or humidity in the atmosphere of a room or other enclosure effected by the humidity and will further indicate the amount of moisture in the enclosure.

Generally stated, the invention consists of the novel devices, combinations of devices and arrangement of parts hereinafter described and defined in the claims.

In the accompanying drawings, which illustrate the invention, like characters indicate like parts throughout the several views.

Referring to the drawings.

Figure 2:
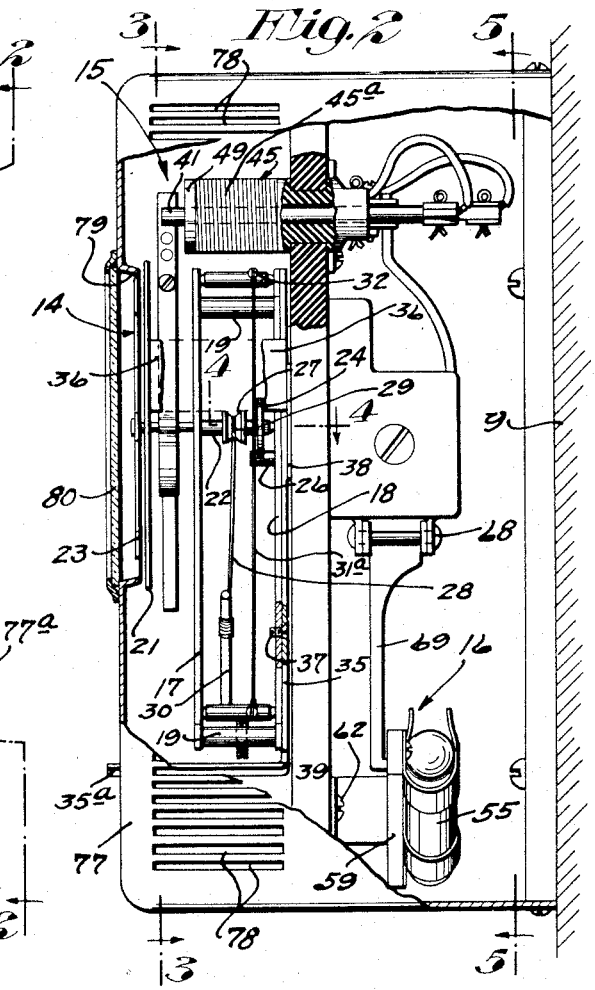
Fig. 2 is a side view of the device taken approximately on the line 2—2 of Fig. 1, some parts being shown in full and some parts being broken away.
Figure 3:
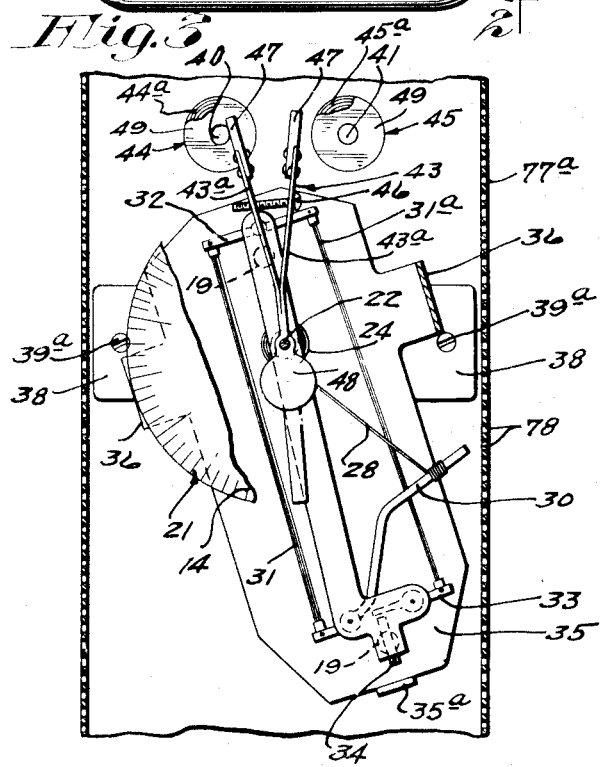
Fig. 3 is a front view with some parts sectioned approximately on the line 3—3 of Fig. 2 and some parts being broken away.
Figure 4:
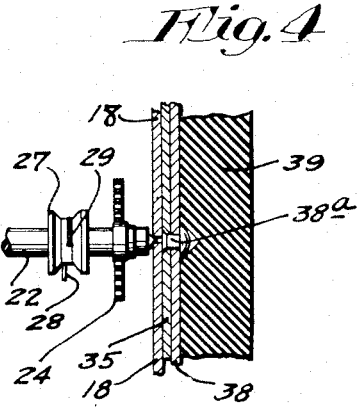
Fig. 4 is an enlarged detail sectional view taken on the line 4—4 of Fig. 2.

Fig. 5 includes a rear view of the device taken approximately on the line 5—5 of Fig. 2 and further includes part of the electrical wiring diagram of the device and associated apparatus;

Fig. 6 includes a view of the device taken on the line 6—6 of Fig. 5 with some parts shown in full and other parts broken away and further includes part of the electrical wiring diagram of the device and associated apparatus; and Fig. 7 is a view diagrammatically illustrating a conventional type of humidifier and also part of the wiring diagram of the electrical hook-up.

In the example here illustrated the media, conditions of which are to be changed, is the atmosphere of a room or the like and the device for changing the conditions of the atmosphere and to be controlled is in the form of a humidifier, shown in Fig. 7. Any desired type of humidifier that is capable of being controlled electrically may be employed. The particular humidifier illustrated includes an air duct 8 that is open at its opposite ends and formed at its bottom with a water receptacle $8^a$. The broken end of the air duct 8 will in practice and may be assumed to extend to a room or other enclosure. Extending across this air duct 8 and into water $y$ in the receptacle $8^a$ is a plurality of absorbent wicks 9. Mounted in the right-hand or intake end of the air duct 8 is an electric motor driven air circulating fan 10, the motor of which is indicated by 11. In this type of humidifier water is evaporated from the wicks into the air circulated through the air duct 8 and then is delivered to the room or enclosure to which the said air duct extends. It will now be apparent that when the fan 10 is in operation, air will be rapidly circulated through the air duct and will evaporate and carry off a relatively great amount of moisture from the wicks 9 and deliver the same to the connected room or enclosure but when the fan is rendered inoperative very little, if any, air will circulate through the air duct and substantially no moisture will be delivered to the room or enclosure.

The fan motor 11 may be supplied with current from any suitable source of supply through leads 12 and 13, which for the purpose of illustration may be assumed to be extensions of a conventional light and power line, not shown.

As illustrated the indicating and control devices includes a conventional type of hygrometer here indicated as an entirety by 14, a primary switch mechanism indicated as an entirety by 15, and a secondary switch mechanism 16.

The hygrometer 14 is of a conventional type and includes a frame made up of laterally spaced opposed front and rear frame members 17 and 18, respectively, that are held in spaced relation by spacers 19. Mounted in fixed spaced parallel relation to the front frame member 17, in a manner to be hereinafter described, is a dial 21 that is calibrated in degrees of relative humidity. Pivotally mounted in the frame plates 17 and 18 and working through the axis of the dial 21 is a spindle 22 that carries an indicator or pointer 23 beyond the dial for movements thereover. Coiled about the spindle 22 and secured thereto at its inner end and anchored to the back plate 17 of the hygrometer frame, by means of a suitable lug 26, is a light spiral hair spring 24 that maintains the spindle under tension to move the pointer in a counter-clockwise direction in respect to Figs. 1 and 2 and opposite the 0 mark on the dial 21. The pointer 23 is moved varying degrees in a clockwise direction from a 0 position and against the action of the spring 24 by means of a moisture sensitive mechanism including a shive 27 fast on the spindle 22, and a thread-like light cable 28 secured to the shive 27 at 29 and wound thereabout. The needle actuating mechanism of the hygrometer further includes an intermediately pivoted movement multiplying lever 30 that is pivoted between the frame members 17 and 18 and to the long end of which the extended end of the cable 28 is attached. The other and much shorter end of the lever 30 is attached to the lower ends of a plurality of human hairs 31, the upper end of which hairs 31 are attached to one end of an intermediately pivoted lever 32, this lever being pivoted between the frame members 17 and 18 near the top thereof and having a plurality of human hairs 31ᵃ attached to the opposite end thereof. The lower ends of the hairs 31ᵃ are attached to the outer end of a short lever 33 that is intermediately pivoted to and between the frame members 17 and 18. The other or inner end of this lever 33 rests against one end of a pointer adjustment screw 34 having screw-threaded engagement with a lower frame spacer 19.

In the hygrometer described, the hairs 31 and 31ᵃ, which are the sensitive elements of the device, expand and contract under variations in moisture or humidity in the surrounding atmosphere and, being connected in series to the multiplying lever 30 and therethrough and the cable 28, shive 27 and spindle 22 to the pointer 23, will move the pointer 23 over the dial 21 and said pointer will indicate on the dial the changing relative humidity in the atmosphere.

The back member 18 of the hygrometer frame is detachably but rigidly mounted on a plate 35 having outstanding brackets 36, to which brackets the dial 21 is securely but removably mounted in a desired manner, not shown. Screws 37 are employed to attach the frame member 18 to the plate 35. Obviously the complete hygrometer mechanism and dial will move as a unit with the back plate 35. The plate 35 is pivotally mounted, co-axial with the hygrometer spindle 22 at 38ᵃ, to a member 38 that is rigidly but detachably mounted on a panel 39 of insulating material by screws or the like 39ᵃ. It will now be evident that the entire hygrometer 14 will be movable pivotally on the axis of the pointer 23 with the plate 35. For the purpose of effecting these pivotal adjustments the plate 35 is provided with an outstanding finger piece 35ᵃ at its bottom.

The switch proper of the primary switch mechanism 16 is made up of spaced retractable contacts 40 and 41 and a cooperating pivotally movable switch arm 43. The spaced retractable contacts 41 and 42 are floating plunger acting cores of electromagnets 44 and 45, respectively. The switch arm 43 is mounted on and for pivotal movements with the hygrometer spindle 22 and is bifurcated at its upper end to afford opposed spring arms 43ᵃ. The spring arms 43ᵃ of the switch arm 43 are under their own spring tension to move apart and are adjustably held in desired spaced relation by means of an adjustment screw 46 that works loosely through one arm and has screw-threaded engagement with the other. At their free ends, the arms 43ᵃ of the switch arm are provided with iron tips 47 that work between and cooperate with the retractable electro-magnetic primary switch contacts 40 and 41. At its lower end the primary switch arm 43 is formed with a counter-balancing weight 48. The coils of the electro-magnets 44 and 45 are indicated by 44ᵃ and 45ᵃ, respectively. These coils are wound upon insulating spools 49 that are mounted on the insulating base 39 above the hygrometer and extend rearwardly therethrough. The retractable primary switch contacts, which as previously stated, are the floating cores of the magnets 44 and 45, respectively, are mounted for axial sliding movements in the spools 49 of the magnets 44 and 45, respectively, and are coupled together for simultaneous movements in opposite directions by linkage including links 50 and a rock arm 51. The rear ends of the contacts 40 and 41 are each provided with a rigidly secured head 52. The links 50 are pivoted one to each at their rear ends to opposite heads 52 at 50ᵃ and at their forward ends are pivoted to opposite ends of the rock arm 51 which arm is intermediately pivoted to a bracket 53 at 54, the bracket 53 being mounted on the insulating base 39 between the contacts 40 and 41. From the drawings and above description, it will be evident that the contacts 40 and 41 are movable into and out of the path of travel of the iron tips 47 of the switch arm and that when one thereof is extended into the path of the switch arm the other thereof will be retracted therefrom.

The secondary switch mechanism 16 includes a secondary switch 55 capable of handling the current drawn by the humidifier motor 11 and preferably and is illustrated being of the well-known mercury bulb type comprising an elongated glass bulb 56 closed at both ends containing a globule of mercury 57 and being equipped with spaced contacts 58 near one end thereof. The bulb 56 is removably clamped to a rock arm 59 that is intermediately pivoted at 60 to a bracket 61, that is mounted fast on the insulating base 39 by screws or the like 62. Obviously, under pivotal movements of the rock arm 59 and bulbs 56 in a clockwise direction in respect to Fig. 5 the mercury 57 will flow to the right-hand end of the bulb and will surround the free ends of and electrically connect the contacts 58 and close the secondary switch and when moved pivotally in a counter-clockwise direction will flow to the left-hand end of the bulb and be spaced from the contacts thereby opening the secondary switch. The preferred form of secondary switch mechanism further includes opposed switch operating electro-magnets 63 and 64 that are supported from the rear side of the insulating base 39 and have their south poles magnetically connected by means of a pole strap 65. The south poles of the magnets 63 and 64 are rigidly but detachably connected to the pole strap 65 by screws 66 and the free ends of the pole strap are mounted on the base 39 by screws or the like 67. Pivoted to the intermediate portion of the pole strap 65 at 68 for movements of its intermediate upper portion between the opposed north poles of the magnets 63 and 64 is an oscillatory switch operating lever 69, the projected lower end of which is laterally offset at 70 and works between opposed upstanding lugs 71 of the rock arm 59 of the secondary switch. This lever 69 is magnetically connected to the pole strap 65 and therefore represents the south poles of the magnets 63 and 64 and will, when the magnets are singularly energized, be attracted by the north pole of the operative magnet and be repelled by the inoperative one thereof which will then represent the south pole of the operative magnet.

By reference to Fig. 5 of the drawings, it will be evident that when the magnet 63 is energized, the lever 69 will be oscillated in a counter-clockwise direction in respect to said figure and will move the switch 55 pivotally in a counter-clockwise direction to its closed operative position and when the magnet 64 is energized the reverse action will take place and the switch 55 will be moved pivotally to an inoperative open position, indicated by dotted lines in Fig. 5. By further reference to Fig. 5 and also by reference to Fig. 7, it will be noted that contacts 58 of the secondary switch are connected one to the humidifier motor supply lead 12 and the other to the humidifier motor supply lead 13 and will therefore control operation of the humidifier.

The primary switch contacts 40 and 41 are operated by the secondary switch actuating magnets 63 and 64 in predetermined timed relation to the secondary switch 55 through the oscillatory magnetically influenced secondary switch actuating lever 69 and the linkage between the contacts in such a manner that the last primary switch contact 40 or 41 to be engaged by the primary switch arm 43 will be retracted out of engagement with and out of the path of travel of said switch arm approximately at the same time the secondary switch 55 reaches a new position. The upper extremity of the oscillator lever 69 is arranged to operate between and alternately on fingers 72 of the rock arm 51. These fingers 72 are so spaced as to permit the free end of the lever 69 to move independent of the fingers 72 during its initial movement by an operative magnet 63 or 64, during which time the effect of the magnet thereon is relatively weak, but to be singularly engaged by the lever 69 during the latter part of a movement thereof by an operative magnet, at which time it will have gathered momentum and the effect of an operative magnet 63 or 64 thereon will be relatively great and increasing, and to be moved thereby sufficiently to completely retract a last engaged primary switch contact and extend the other thereof.

From the drawings it will be apparent that when the secondary switch 55 is closed, the primary switch contact 40 will be retracted and the primary switch contact 41 will be extended into the path of travel of the switch arm 43.

The coils of a magnet 63 and 64 of the secondary switch mechanism 16, indicated by 63$^a$ and 64$^a$, respectively, and the coils 44$^a$ and 45$^a$ of the magnets 44 and 45, respectively, are energized from a suitable low voltage flow of potential B, which, for the purpose of this case, may be assumed to be a battery or batteries. The magnet coil 40$^a$ of the primary switch mechanism and the magnet 63$^a$ of the secondary switch mechanism are connected in a series circuit including a lead 73 connecting one side of the battery B to the primary switch arm 43 through the hygrometer spindle 22, the switch arm 43, the retractable primary switch contact 40, a lead 74 connecting the primary switch contact 40 to one end of the coil 44$^a$, the coil 44$^a$, a lead 75 connecting one end of the coil 44$^a$, to one end of the coil 63$^a$ and ground connections indicated connecting the other end of the coil 63$^a$ and the other side of the battery B. The magnet coils 45$^a$ and 64$^a$ are connected in a series circuit including the lead 73, the primary switch arm 43, the primary switch contact 41, a lead 76 between the primary switch contact 41 and one end of the magnet coil 45$^a$, a lead 77 between the other end of the coil 45$^a$ and one end of the magnet coil 64$^a$, and ground connections indicated between the other end of the coil 64$^a$ and the other side of the battery B.

The entire indicating and circuit controlling apparatus described, with the exception of the battery B, is normally contained within a relatively small case 77$^a$ having perforations 78 in its sides for circulation of air through the case and a sight opening 79 in its face opposite the hygrometer dial, and which sight opening is preferably closed by a transparent plate of glass or other suitable material 80. The front of the case 77$^a$ is further provided with a segmental slot 81 through which the adjustment finger 35$^a$ projects for accessibility from the exterior of the casing. The casing is further provided on its face above the sight opening 79 and at a point midway between the primary switch contacts 40 and 41 with a neutral reading point 82 in the shape of an arrow, for cooperation with the rotatively adjustable hygrometer dial 21.

To adjustably set the device to maintain humidity at a desired point the entire hygrometer and switch arm 43 are rotated as a unit by means of the finger 35$^a$ until the hygrometer dial calibration representing the desired percentage of relative humidity is brought into registration with the neutral point 82. In the particular arrangement illustrated, the range of adjustment is limited by a slot 81 and the width of the casing so that only certain intermediately located dial calibrations can be adjustably moved into registration with the neutral reading point 82 but the range of adjustment available is nevertheless sufficient to meet all ordinary room requirements. Obviously, the range of adjustment can readily be increased by merely increasing the width of the casing 77$^a$ and providing the same with a longer slot 81. In the drawings the parts are illustrated as being adjusted to maintain the atmosphere in the room at approximately 45° relative humidity (see Fig. 1).

Figure 1:
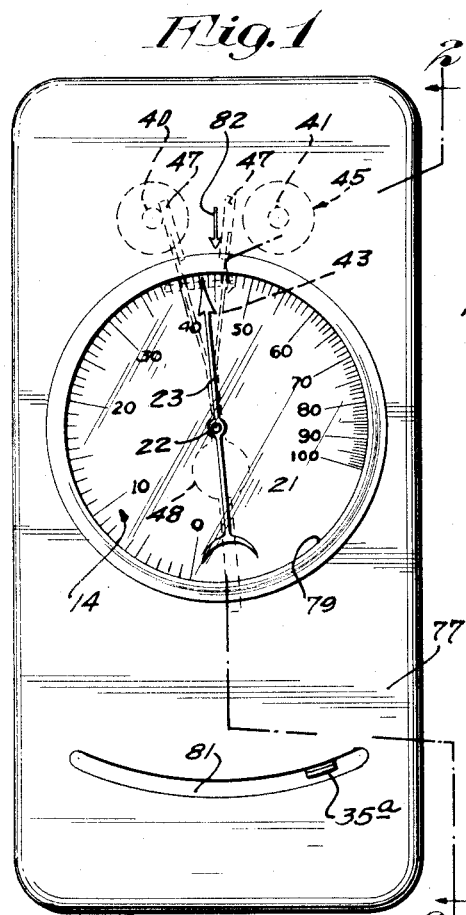
Fig. 1 is a view in front elevation of the complete device.

The description of the operation will start at the point of low humidity wherein the parts of the device are in positions shown by full lines in the drawings and in which position the secondary switch 55 is closed thereby closing the circuit through leads 12 and 13 and the humidifier fan motor 11 and rendering the humidifier operative. Attention is called to the fact that at this time the primary switch contact 40 is retracted out of the path of travel of the primary switch arm tips 47 and the contact 41 is extended into the path of travel of said primary switch arm tips 47. Attention is further directed to the fact that the primary switch arm 43 is substantially aligned with the pointer 23 of the hygrometer and that the upper arms thereof are so adjusted in respect to one another that the tips 47 thereof are considerably less distant apart than the distance between the contacts 40 and 41 and that the left-hand one thereof in respect to Fig. 1 is substantially aligned with its cooperating retracted primary switch contact 40 and the right-hand one thereof is spaced from its cooperating primary switch contact 41 in a counter-clockwise or left-hand direction in respect to Fig. 1.

*Operation*

The humidifier now being in operation will continue to increase the relative humidity in the atmosphere surrounding the indicating and control device and the hydrometer pointer 23 will be moved by the hairs or sensitive elements 31 and 31a over the calibrated dial in a clockwise direction to indicate the increase in relative humidity, and the switch arm 43, being mounted for common movements with the pointer 23, will also move in a clockwise direction thereby bringing its right-hand tip 47 increasingly closer to its cooperating primary switch contact 41. This movement of the switch arm and pointer is very slow and the pressure exerted thereon by its moisture sensitive actuating element 30 and 31a is very feeble. When the moisture in the air is increased to approximately the desired maximum the right-hand tip of the switch arm 43 will make a feeble contact with the primary switch contact 41, which will momentarily close the circuit through the coil 64a of the magnet 64 and the coil 45a of the magnet 45. This momentary contact, while feeble, is nevertheless sufficient to energize the coil 45a and create a magnetic field about the end of the primary switch contact 41, which will draw the right-hand tip 47 of the switch arm 43 tightly thereagainst and thus form a sufficiently tight contact to energize the magnet 64 of the secondary switch actuating mechanism. When the magnet 64 becomes energized, the lever 69 will be drawn thereto and will move the secondary switch 55 to its inoperative circuit open position shown by dotted lines in Fig. 5. The upper end of the lever 69 acting on the linkage between the primary contacts 40 and 41 in a manner hereofore described will retract the primary switch contact 41 out of engagement with and out of the path of travel of the engaged primary switch arm contact 47 and simultaneously extend the primary switch contact 40 into the path of travel of the switch arm tips 47. The retracting of the contact 41 out of engagement with its cooperating primary switch arm tips 47 will, of course, break the circuit through the magnets 64 and 65. The humidifier will now be inoperative and therefor the relative humidity in the room will immediately begin to decrease and as the humidity decreases the hygrometer pointer 23 and the switch arm 43 respond to the decrease in humidity and move gradually in a counter-clockwise direction, the pointer 23 indicating the decrease in relative humidity. When the humidity decreases to approximately the desired minimum the left-hand tip 47 of the switch arm 43 will come into initial feeble contact with the now extended contact 40 thereby momentarily closing the circuit therethrough and the magnet coils 44a and 63a. The magnet coil 44a now being energized will set up a magnetic field about the end of the contact 40 which will draw the cooperating switch arm tip 47 into tight non-arcing engagement therewith and the magnet coil 63a of the magnet 63 now also being energized, the said magnet 63 will be operative and draw the oscillatory arm 69 thereto thereby closing the secondary switch 55 and consequently setting the humidifier back into action and simultaneously retracting the contact 40 out of engagement with and out of the path of travel of the switch arm 43 and extending the primary switch contact 41.

It will readily be seen that the percentage of variation in relative humidity above and below that represented by the dial calibration set in registration with the neutral reading point 82 will be governed mainly by the distance required for the switch arm 43 to move between its cooperating contacts 40 and 41 and that the greater this distance the greater will be the variation. While under certain conditions several degrees of variation are permissible under other conditions it is desirable to maintain the humidity very close to a desired set point and it is to this end that I provide the switch arm 43 with the relatively adjustable spring arms 43a. By means of the adjustment screw 46 the spring members 43a of the switch arm 43 may be adjusted so that the switch arm 43 moves such a slight distance between contacts 40 and 41 that humidifier will be cut alternately into and out of action under one or two per cent variations in relative humidity or less.

In this device the feeble action of the hygrometer is only employed to momentarily close the circuit or in other words to close the circuit through an electro-magnet which therefore tightly closes and maintains the circuit closed through the actuating mechanism of the secondary switch during the operation thereof. The action of these magnets is so quick that there is no arcing or sparking between the contact points of the switch arm 43 and the operating contacts 40 or 41 and therefore there is no apparent corrosion between the contacts 40 or 41 and their respective cooperating contact portions or tips of the switch arm 43. It will also be seen that the wiping action of the contacts 40 and 41 on the switch arm caused by retracting of the contacts 40 and 41 out of engagement with the switch arm, keep said contacts 40 and 41 and cooperating contact portions of the switch arm well cleaned and polished.

In case the hygrometer of the device is adjusted to maintain the humidity at a point considerably above or below the present condition of the atmosphere in the room at the time of setting, the switch arm 43 may be moved out of its operative zone between the retractable contacts 40 and 41, in which case it will, when the humidity increases or decreases to the approximately desired extent, automatically move into its normal operative zone between the contacts and will then begin to act as a controlling switch.

From the foregoing the following facts will be evident: That the device illustrated, when used in connection with an efficient humidifier, will so control the action thereof as to maintain atmosphere surrounding the same at or very close to a desired condition; will indicate a desired condition of the atmosphere; will further indicate the exact condition of the atmosphere surrounding the same; and may readily be adjusted to maintain the atmosphere in different desired conditions.

What I claim is:

1. In an indicating circuit controller, and dial, movable indicating and switch arm means, spaced contacts, an actuating device for said movable indicating and switch arm means operative to move the same in relation to the spaced contacts and dial, and means for adjustably shifting the relation of the said movable indicating and switch arm means to the spaced contacts without changing the relation between the movable indicating and switch arm means to its actuating device or said dial.

2. The combination with circuit controlling and indicating means including a dial, spaced contacts, a switch arm and a sensitive element operative to move the switch arm between said contacts and in relation to the dial under changes in conditions of a surrounding medium, of means for adjustably shifting the relation of the switch arm and dial to the spaced contacts.

3. The combination with circuit controlling and indicating means including a dial, spaced contacts, pivoted switch arm and pointer means, and a sensitive element operative to move the pivoted switch arm and pointer means between said spaced contacts and in relation to said dial, of means for adjustably shifting the relation of the switch arm and pointer means and dial to the spaced contacts.

4. The combination with circuit controlling and indicating means including a dial, spaced contacts, a switch arm and a sensitive element operative to move the switch arm between said contacts and in relation to the dial under changes in conditions of a surrounding media, of means for shifting the switch arm and pointer means, sensitive means and dial as a unit in respect to the spaced contacts.

5. The combination with circuit controlling and indicating means including a dial, spaced contacts, pivoted switch arm and pointer means, and a sensitive element operative to move the pivoted switch arm and pointer means between said spaced contacts and in relation to the said dial, of means for shifting the switch arm and pointer means, sensitive element and dial as a unit in respect to the spaced contacts.

6. In an indicating circuit controller, a dial, spaced contacts, a sensitive element, a pointer operated by the sensitive element and movable over the said dial, a switch arm also operated by said sensitive element for movements between said spaced contacts, and means for adjustably shifting the dial, pointer, switch arm and sensitive element as a unit in respect to said spaced contacts.

7. In an indicating circuit controller, the combination with a hygrometer comprising a dial, a pivoted pointer, and a sensitive element operative to move the pointer pivotally over said dial, of spaced contacts, a switch arm mounted co-axially with said pointer and movable by the sensitive element between said contacts, and means for adjustably moving the entire hygrometer and switch arm as a unit in respect to the spaced contacts.

8. In an indicating circuit controller, the combination with a hygrometer comprising a dial, a pivoted pointer, and a sensitive element operative to move the pointer pivotally over said dial, of spaced contacts, a switch arm mounted co-axially with said pointer and movable by the sensitive element between said contacts, and means for adjustably rotatively moving the entire hygrometer and switch arm on the axis of the pointer and switch arm and in respect to the spaced contacts.

9. The structure defined in claim 5 in which the said switch arm is provided with relatively adjustable contact portions, and means for adjusting the same to vary the amount of movement of the switch arm between the said cooperating spaced contacts.

CARL J. ULRICH.